United States Patent
Williams

(10) Patent No.: US 10,913,423 B2
(45) Date of Patent: *Feb. 9, 2021

(54) ASPIRATING AIRBAG MODULE ASSEMBLIES AND COMPONENTS

(71) Applicant: Autoliv ASP Inc., Ogden, UT (US)

(72) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/146,779

(22) Filed: Sep. 28, 2018

(65) Prior Publication Data

US 2020/0101933 A1    Apr. 2, 2020

(51) Int. Cl.
- *B60R 21/30* (2006.01)
- *B60R 21/217* (2011.01)
- *B60R 21/26* (2011.01)
- *B60R 21/261* (2011.01)

(52) U.S. Cl.
CPC ............ *B60R 21/30* (2013.01); *B60R 21/217* (2013.01); *B60R 2021/2612* (2013.01); *B60R 2021/26076* (2013.01); *B60R 2021/26094* (2013.01)

(58) Field of Classification Search
CPC ................. B60R 21/217; B60R 21/30; B60R 2021/26076; B60R 2021/26094; B60R 2021/2612
See application file for complete search history.

(56) References Cited

U.S. PATENT DOCUMENTS

| | | | |
|---|---|---|---|
| 3,909,037 A | | 9/1975 | Stewart |
| 3,910,595 A | * | 10/1975 | Katter ..................... B60R 21/30 280/732 |
| 4,368,009 A | * | 1/1983 | Heimovics, Jr. ...... B61B 12/005 417/179 |
| 4,928,991 A | | 5/1990 | Thorn |
| 5,207,450 A | * | 5/1993 | Pack, Jr. ................. B60R 21/30 280/731 |
| 5,286,054 A | * | 2/1994 | Cuevas ................. B60R 21/217 280/738 |

(Continued)

FOREIGN PATENT DOCUMENTS

| EP | 0046275 | | 2/1982 |
|---|---|---|---|
| JP | 2000255372 A | * | 9/2000 |
| WO | WO9640556 | | 12/1996 |

OTHER PUBLICATIONS

PCT/2017/048436, International Search Report, dated Nov. 8, 2017 (2 pgs.).
PCT/2017/048436, Written Opinion, dated Nov. 8, 2017 (6 pgs.).

*Primary Examiner* — Laura Freedman

(74) *Attorney, Agent, or Firm* — Matthew D. Thayne; Thayne and Davis LLC

(57) ABSTRACT

Airbag cushion assemblies for aspirating ambient air and related assemblies, methods, and components. Some embodiments may comprise an aspirating airbag cushion assembly comprising an airbag cushion housing, an aspiration housing coupled to the airbag cushion housing and comprising an aspiration inlet configured to allow for receipt of ambient air into an airbag cushion, and an inflation module slidably coupled to the aspiration housing. The inflation module may comprise an inflator and one or more inflation tubes or other conduits fluidly coupled with the inflator and configured to deliver inflation gas from the inflator into the airbag cushion.

20 Claims, 11 Drawing Sheets

(56) References Cited

U.S. PATENT DOCUMENTS

| | | | |
|---|---|---|---|
| 5,437,473 | A | 8/1995 | Henseler |
| 5,470,105 | A | 11/1995 | Rose et al. |
| 5,588,675 | A | 12/1996 | Lotspih |
| 5,605,347 | A | 2/1997 | Karlow |
| 5,681,055 | A | 10/1997 | Green et al. |
| 5,752,715 | A * | 5/1998 | Pripps ................ B60R 21/2171 |
| | | | 280/732 |
| 6,155,600 | A | 12/2000 | Reynolds et al. |
| 6,213,496 | B1 * | 4/2001 | Minami ................ B60R 21/231 |
| | | | 280/729 |
| 6,227,566 | B1 | 5/2001 | Kusaka |
| 6,513,602 | B1 | 2/2003 | Lewis et al. |
| 6,799,777 | B2 | 10/2004 | Hawthorn |
| 7,325,830 | B2 | 2/2008 | Higuchi |
| 7,367,585 | B2 | 5/2008 | Yu |
| 7,510,212 | B2 | 3/2009 | Green |
| 7,530,596 | B2 | 5/2009 | Bito |
| 7,584,987 | B2 | 9/2009 | Choi |
| 7,695,009 | B2 | 4/2010 | Johanson et al. |
| 7,762,580 | B2 | 7/2010 | Rink et al. |
| 7,938,443 | B1 | 5/2011 | Smith |
| 9,039,038 | B2 | 5/2015 | Breed |
| 10,124,759 | B2 * | 11/2018 | Smith ..................... B60R 21/36 |
| 2007/0052222 | A1 | 3/2007 | Higuchi |
| 2013/0049337 | A1 | 2/2013 | Bogenrieder et al. |
| 2014/0361522 | A1 | 12/2014 | Breed |
| 2018/0079384 | A1 | 3/2018 | Smith et al. |

\* cited by examiner

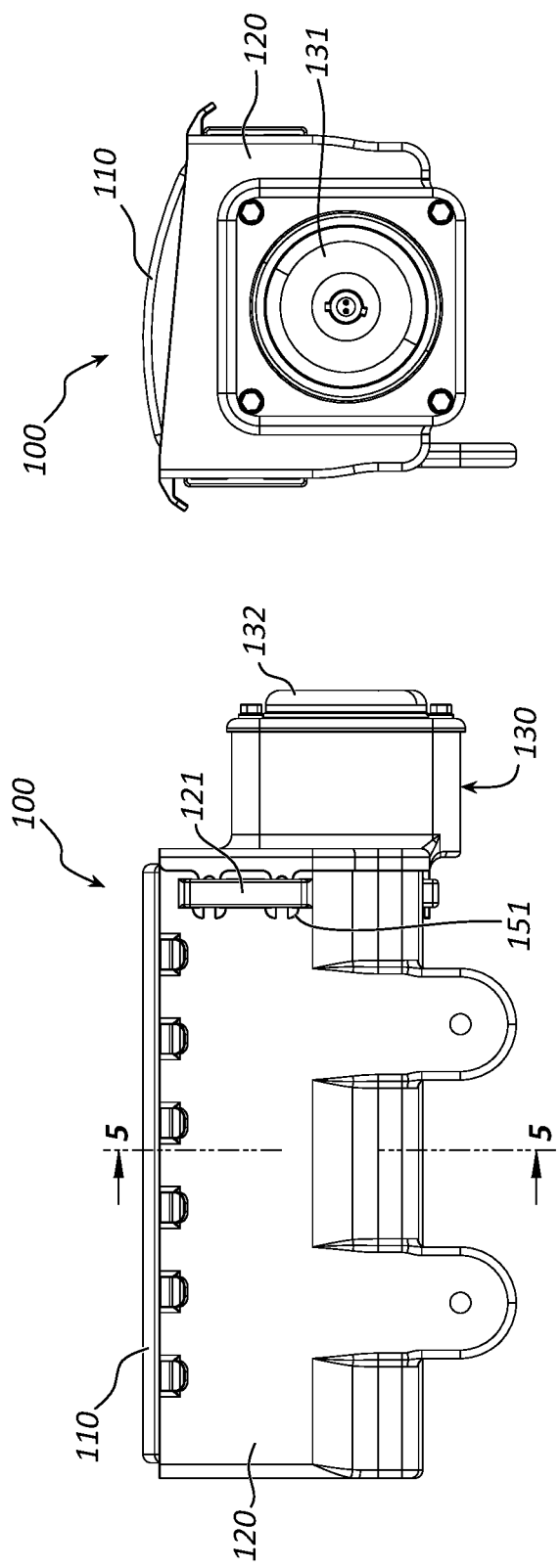
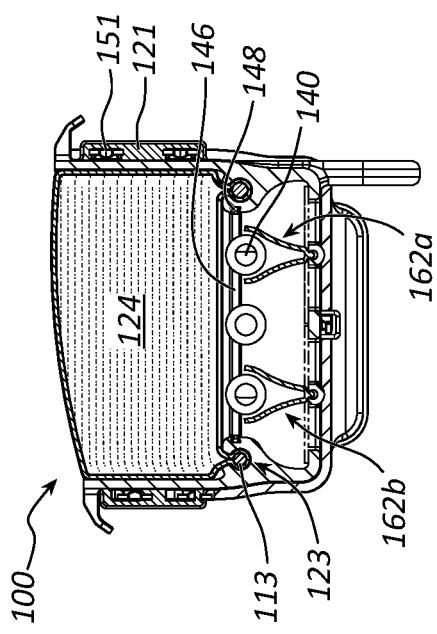
FIG. 3
FIG. 4
FIG. 5

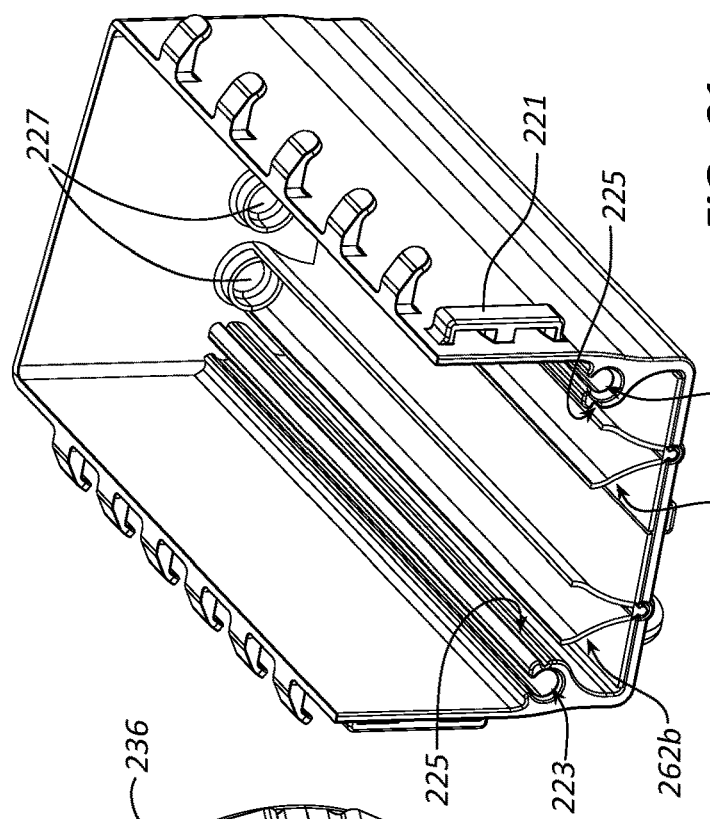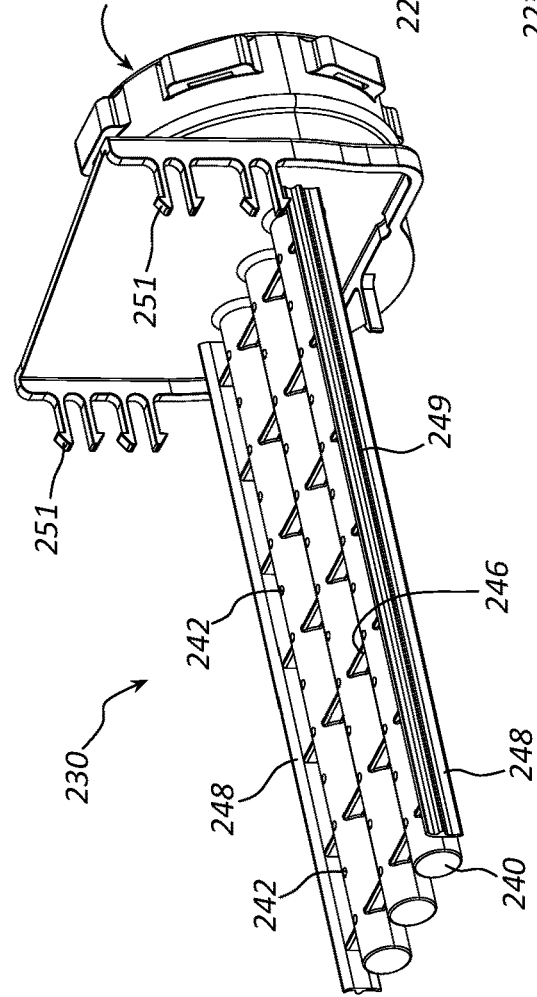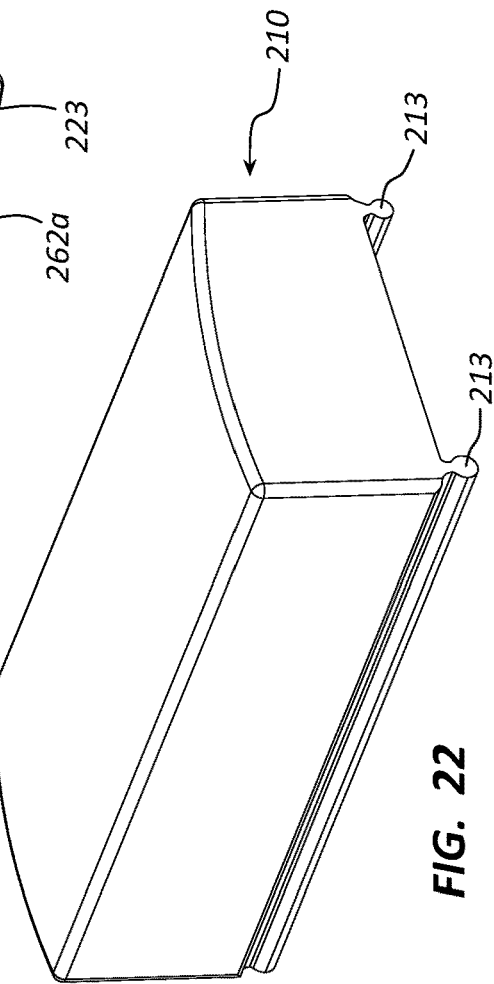

ASPIRATING AIRBAG MODULE ASSEMBLIES AND COMPONENTS

SUMMARY

Various improvements in vehicle technologies, such as autonomous vehicles, may require changes in the way airbag assemblies operate. For example, in some autonomous vehicles, or other newer vehicles, larger airbags may be used. This may be needed, for example, due to a larger distance between the airbag module and the vehicle occupant. In some systems, it is even contemplated that a single cushion may be used to provide protection to multiple occupants.

However, existing aspirating airbag assemblies suffer from many drawbacks, such as being large, bulky, and/or complicated, often requiring many different components and valve mechanisms. Such existing assemblies are often complicated and/or unnecessarily difficult to assembly, adding further to costs.

The present inventors have therefore determined that it would be desirable to provide systems and methods that overcome one or more of the foregoing limitations and/or other limitations of the prior art. In some embodiments, the inventive concepts disclosed herein may allow for providing an assembly that has relatively few modules/sub-assembly elements, each of which may be configured to facilitate simple coupling during an assembly process. Such assemblies may, for example, be configured with modules/sub-assembly elements that are slidably couplable to each of the other major modules/sub-assembly elements and/or that "snap-fit" together. In some embodiments, this may be accomplished without requiring, or at least substantially without requiring, any external fasteners for coupling these elements to one another.

In a more particular example of an airbag cushion assembly according to some embodiments, the assembly may comprise an airbag cushion housing comprising an airbag cushion configured to deploy from the airbag cushion housing. An aspiration housing may be coupled to the airbag cushion housing and may comprise an aspiration inlet configured to allow for receipt of ambient air into the airbag cushion during inflation of the airbag cushion. An inflation module may be slidably coupled to the aspiration housing. The inflation module may comprise an inflator, or may at least comprise an opening, recess, or other region configured to receive an inflator. The inflation module may further comprise at least one inflation tube or other inflation conduit fluidly coupled with the inflator. The at least one inflation conduit may be configured to deliver inflation gas from the inflator into the airbag cushion during an inflation event, which may result in entraining of aspirating air from the ambient environment as well.

Some embodiments may further comprise a valve assembly comprising one or more valves, such as flap valves, configured to open upon actuation of the inflator. Preferably the valve(s) are configured to close during inflation of the airbag cushion to prevent air and inflation gas from exiting through the aspiration inlet at a particular phase of inflation (either during or after inflation, for example).

In some embodiments, the inflation module may further comprise an endcap configured to at least substantially close at least one side of the housing upon coupling the inflation module with the aspiration housing. In some such embodiments, the endcap may be an integrally formed element of the inflation module. In some embodiments, the endcap may comprise a gas inlet port, which gas inlet port may be fluidly coupled with the inflator and the inflation tube/conduit.

In some embodiments, the inflation module may further comprise a first mating component, the aspiration housing may further comprise a second mating component, wherein the first mating component is configured to mate with the second mating component to couple the inflation module with the aspiration housing. In some such embodiments, the first mating component may comprise one or more elongated grooves and the second mating component may comprise one or more elongated protrusions. In some such embodiments, the elongated groove(s) may be configured to slidably receive the elongated protrusion(s).

In some embodiments, the aspiration module may further comprise at least one protrusion configured to be received within the at least one inflation conduit to facilitate coupling the inflation module to the aspiration housing. In some such embodiments, the protrusion(s) may define a rim and a hollow region for receiving and engaging the inflation conduit(s) therein.

In an example of an aspirating airbag cushion assembly according to another embodiment, the assembly may comprise an airbag cushion and a housing comprising an aspiration inlet configured to allow for receipt of ambient air into the airbag cushion during inflation of the airbag cushion. In some embodiments, the assembly may further comprise another housing configured to receive the airbag cushion. The assembly may further comprise an inflator, which may be received in and/or configured to be received in an inflation module comprising a plurality of inflation conduits configured to deliver inflation gas from the inflator. Each of the plurality of inflation conduits may comprise a plurality of inflation ports, such as high-velocity inflation ports configured to entrain ambient air through the aspiration inlet. The inflation module may be configured to be coupled with the housing by way of at least one groove configured to mate with and receive at least one protrusion.

In some embodiments, the inflation module may be configured to be slidably coupled to the housing. In some embodiments, the inflation module may comprise a pair of opposing, elongated protrusions, and the housing may comprise a plurality of opposing, elongated grooves configured to slidably receive the pair of opposing, elongated protrusions.

Some embodiments may further comprise a valve assembly comprising at least one valve flap. Some such embodiments may comprise an elongated bead or other protrusion. In some such embodiments, this bead/protrusion may be formed along a pivot point/line of the valve flaps and may be slidably received within a corresponding, elongated slot, which may be formed along an interior portion of the housing comprising the aspiration inlet. In some such embodiments, one or both of the bead and slot may comprise a bulbous lower portion and a narrowed neck portion to ensure that valve assembly is locked in place within the aspiration housing.

In some embodiments, the valve assembly may be configured such that the at least one valve flap opens upon actuation of the inflator. The valve assembly may further be configured such that the at least one valve flap closes following aspiration of the airbag cushion to prevent air and inflation gas from exiting through the aspiration inlet following inflation of the airbag cushion.

In yet another example of an aspirating airbag cushion assembly according to other embodiments, the assembly may comprise an airbag cushion and a housing, such as an aspiration housing, comprising a first side comprising an aspiration inlet configured to allow for receipt of ambient air into the airbag cushion during inflation of the airbag cushion; a second side opposite from the first side, wherein the second side comprises a first opening for receiving the airbag cushion; a third side extending between the first side and the second side at a first end of the housing, wherein the third side is at least substantially closed; and a fourth side opposite from the third side at a second end of housing, wherein the fourth side comprises a second opening. The assembly may further comprise an inflation module configured to be received in the second opening. The inflation module may comprise an endcap, which may be configured to at least substantially close (in some embodiments, fully close) the fourth side upon coupling the inflation module with the housing. In some such embodiments, the endcap may be integrally formed element of the inflation module along with, in some embodiments, one or more inflation conduits.

In some embodiments, the endcap may comprise a gas inlet port, which may be configured to fluidly couple the inflator with one or more inflation tubes or other inflation conduits. Thus, in some embodiments, the inflation module may comprise an inflator and a plurality of inflation conduits. The gas inlet port may be fluidly coupled with the inflator to allow for delivery of inflation gas into the plurality of inflation conduits. In some embodiments, the inflation module further may further comprise a frame, which may be configured to stabilize the inflation conduits during inflation. The frame may comprise one or more (in some embodiments, a plurality) of support members extending, for example, parallel to and/or perpendicular to the inflation conduits.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 3 is a side elevation view of the aspirating airbag inflation assembly of FIG. 1;

FIG. 4 is a front elevation view of the aspirating airbag inflation assembly of FIG. 1;

FIG. 5 is a cross-sectional view taken along line 5-5 in FIG. 3;

FIG. 20 is a perspective view of an aspirating airbag inflation module according to another embodiment;

FIG. 21 is a perspective view of an aspiration housing of an aspirating airbag inflation assembly according to another embodiment;

FIG. 22 is a perspective view of an airbag cushion housing of an aspirating airbag inflation assembly according to another embodiment.

DETAILED DESCRIPTION

Figure 1:
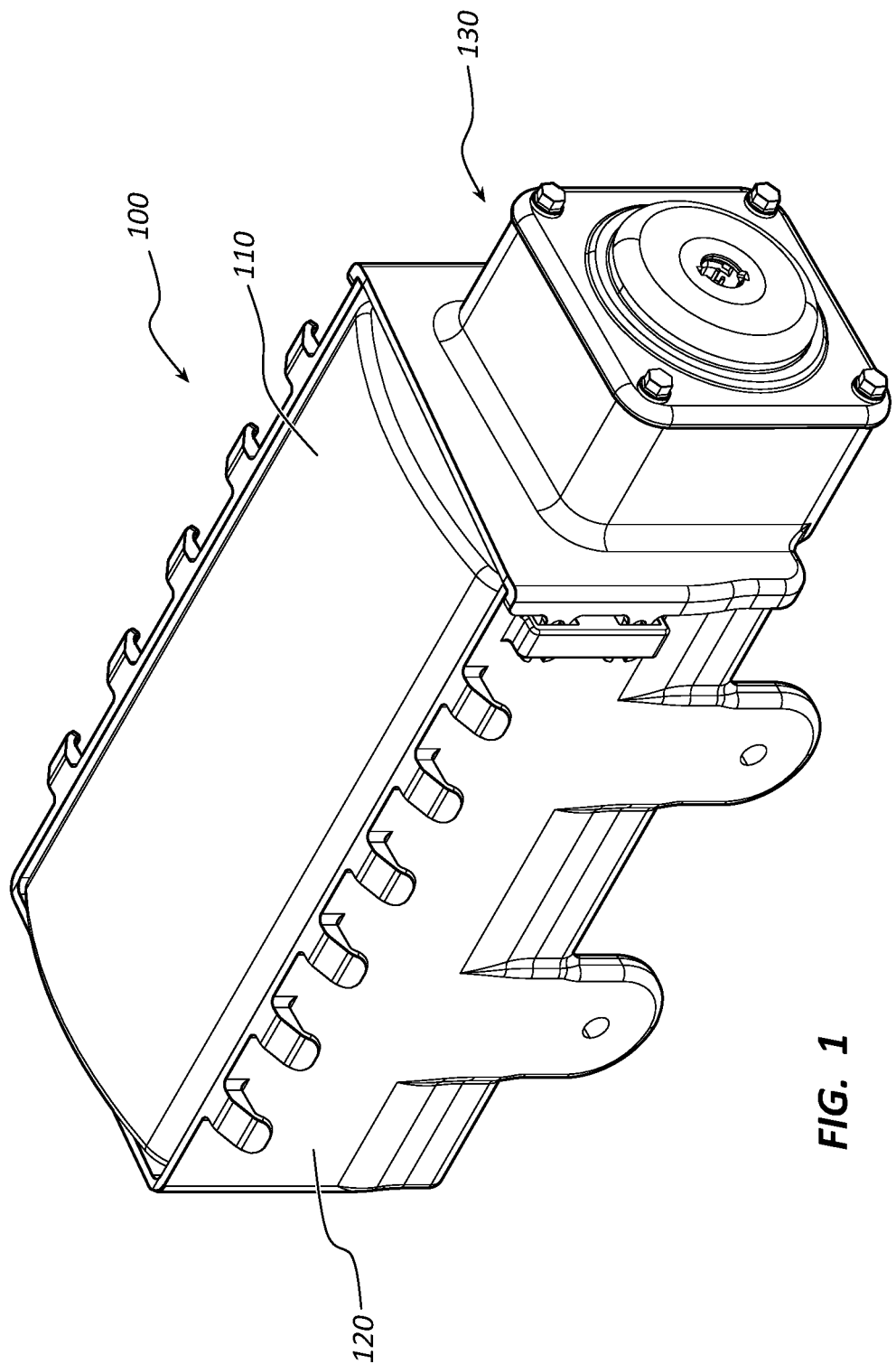
FIG. 1 is a perspective view of an aspirating airbag inflation assembly according to some embodiments.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

Apparatus, methods, and systems are disclosed herein relating to aspirating airbag cushion assemblies configured to utilize ambient air, in some cases along with inflation gas, to inflate larger airbag cushions, such as, in some embodiments, airbag cushions for multiple occupants, airbag cushions for autonomous vehicles, or pedestrian airbag cushions. Various embodiments disclosed herein may provide unique features to improve, for example, the coupling mechanisms, components, and/or functionality of such assemblies.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts an aspirating airbag cushion assembly 100. Aspirating airbag cushion assembly 100 comprises an airbag cushion housing 110 comprising an airbag cushion 124 (not shown in FIG. 1; see FIG. 5) positioned and configured to deploy therefrom. Aspirating airbag cushion assembly 100 further comprises an aspiration housing 120 coupled to the airbag cushion housing 110. The aspiration housing 120 comprises an open side and/or opening at its upper side for receiving an airbag cushion and/or coupling and/or receiving airbag cushion housing 110 thereto. Opposite this open side, aspiration housing 120 comprises an aspiration inlet 122 configured to allow for receipt of ambient air into the airbag cushion during inflation. In the depicted embodiment, aspiration inlet 122 comprises a plurality of openings aligned in a grid pattern along this side of aspiration housing 120. However, it is contemplated that, in alternative embodiments, the aspiration inlet may comprise a single opening (in some such embodiments, the entire lower side of aspiration housing 120 may be open) or may comprise any other suitable number of openings as desired.

An inflation module 130 may be coupled to the aspiration housing 120. As described in greater detail below, in preferred embodiments, including the embodiment depicted in FIGS. 1-11, inflation module 130 may be slidably coupled to the aspiration housing 120. Inflation module 130 comprises an inflator 132. Inflator 132 in the depicted embodiment comprises a disc inflator. However, other embodiments are contemplated in which inflator 132 may instead comprise another type of inflator, such as a tubular inflator or another suitable inflator.

Figure 2:
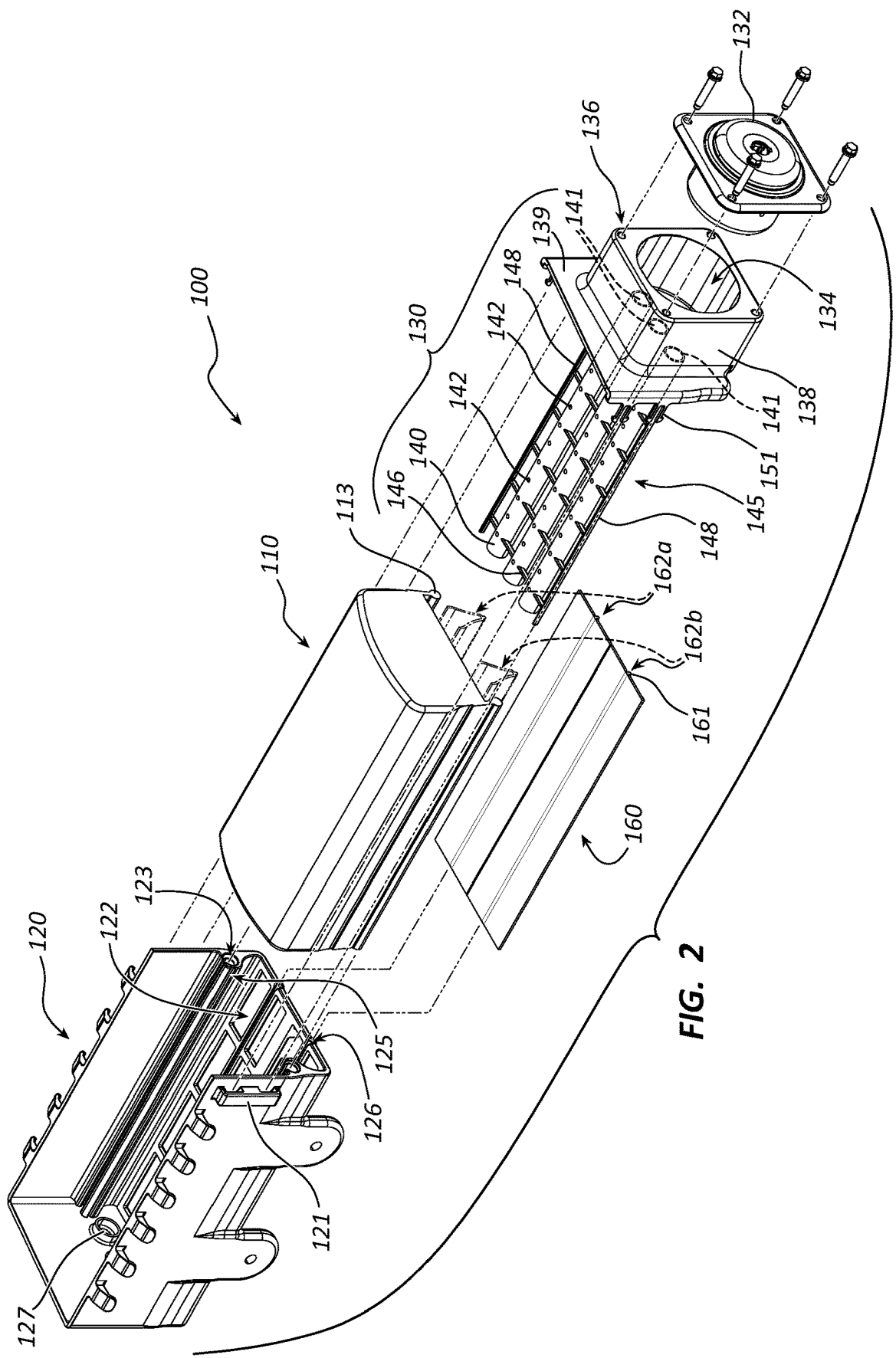
FIG. 2 is an exploded, perspective view of the aspirating airbag inflation assembly of FIG. 1.

Inflator 132 is configured to be received in a recess 134 formed in an endcap 136 of inflation module 130 and may be configured to be coupled therein by way of one or more fasteners, as best shown in FIG. 2. As discussed below in connection with other embodiments, however, the inflation may be coupled to the inflation module and/or another portion of the inflation assembly without use, or at least substantially with use, of any such fasteners.

Endcap 136 comprises an inflator hub 138 protruding from a plate portion 139. Hub 138 defines recess 134 for receiving inflator 132 therein. Again, as described in greater detail below, endcap 136 is, preferably and in the depicted embodiment, configured to close, or at least substantially close, one side (possibly more than one side in other embodiments) of the aspiration housing 120 upon coupling the inflation module 130 with the aspiration housing 120. In some embodiments, endcap 136 is an integrally formed element of the inflation module 130, which may simplify the assembly process and/or provide a more secure finished assembly.

More particularly, aspiration housing 120 comprises a first or lower side comprising an aspiration inlet 122 configured to allow for receipt of ambient air into the airbag cushion 124 during inflation. Aspiration housing 120 further comprises a second or upper side opposite from the first side that is configured to receive airbag cushion 124 and/or airbag cushion housing 110 therein. A third side of aspiration housing 120 extends between the upper and lower sides/ends and is closed or at least substantially closed. As shown in FIG. 2, this third side, which comprises coupling elements and/or protrusions 127, is open (other embodiments are contemplated in which this side is at least substantially open or comprises one or more openings, however).

This open side or, in other embodiments, one or more openings, may be configured to be closed, or at least substantially closed, by inflation module 130. More particularly, inflation module 130 is configured to be received in the open side of aspiration housing 120 and to close this side/opening upon being fully coupled with, which in the case of the depicted embodiment means fully slid into, inflation module 130. Endcap 136 is therefore configured to close this side of aspiration housing 120, which may be facilitated by providing plate portion 139 of inflator hub 138. Again, in preferred embodiments, endcap 136 is an integrally-formed element of inflation module 130 to further simplify manufacturing and/or assembly.

Inflation module 130 further comprises a plurality of inflation tubes 140 or other inflation conduits fluidly coupled with inflator 132. Each of the inflation tubes 140 comprises a plurality of inflation ports 142 and each of the inflation tubes 140 and/or inflation ports 142 is configured to deliver inflation gas from inflator 132 into the airbag cushion. Preferably, assembly 100 is configured such that the inflation gas is delivered at a sufficiently high velocity to draw ambient air through aspiration inlet 122 and into the airbag cushion during inflation. In alternative embodiments, each of inflation ports 142 may be formed on a nozzle or the like, which may extend from one or more of inflation conduits 140.

It is preferred that a relatively large number of inflation ports 142 be used in order to create a sufficient pressure differential to drive the aspiration and to provide uniform distribution of the inflation gas driving aspiration. Although thirty-six nozzles are shown in the preferred embodiments depicted in the drawings, this precise number is not required. In addition, preferably each of the high-velocity ports 142 is configured to keep the inflation gas delivered therethrough in a relatively tight column while being delivered into the airbag cushion rather than expanding into a plume of gas. This may further facilitate creation of the desired pressure differential to drive the aspiration process. Thus, it is preferred that the pressure driving inflation ports 142 not exceed about 500 psi. It may also be preferred that this pressure be at least about 100 psi. Thus, in some preferred embodiments, the pressure within the inflation conduits 140 is between about 100 and about 500, or, in some such embodiments, between 100 and 500, psi.

Although a relatively high-velocity may be desirable, in some embodiments, it may be preferred to keep the velocity of the gas from ports 142 from reaching a certain upper limit. For example, in certain preferred embodiments, the airbag inflation module 130 may be configured such that the gas delivered from ports 142 is below supersonic velocities. This may be useful in preventing the plume created by the incoming gas from getting too large. Thus, it may be preferred to keep the gas from ports 142 as close to being delivered in a vertical column/stream as possible.

It may also be preferred that the ports 142 be spaced apart from one another sufficiently such that the streamlines of the expanding gas do not intersect, or at least intersect minimally. Thus, preferably the ports 142 are spaced apart with the maximum amount of space in between each adjacent port within the area allotted to the aspiration inlet 122, such as the case in the depicted embodiment.

Inflation module 130 further comprises a frame 145 defined by a plurality of support members 146 extending perpendicular to the inflation conduits 140. Additional support members 148 may extend parallel to conduits 140. Such parallel support members 148 may bound conduits 140 on opposite ends of frame 145, as shown in the depicted embodiment. In other contemplated embodiments, parallel support members may be placed in between adjacent conduits 140, either in addition to or as an alternative to the perimeter support members 148 shown in the depicted embodiment. Frame 145 is preferably configured to provide stability to each of the various tubes/conduits 140 during deployment.

Assembly 100 further comprises a valve assembly 160. Valve assembly 160 may comprise one or more valves preferably configured to automatically open upon actuation of inflator 132 and further configured to automatically close during inflation of the airbag cushion to prevent air and inflation gas from exiting through aspiration inlet 122. In some embodiments, the one or more valves of the valve assembly 160 may be configured to automatically close at a predetermined stage during inflation of the airbag cushion.

In the depicted embodiment, valve assembly 160 comprises a first valve 162a and a second valve 162b. Valves 162a and 162b may comprise flaps, such as butterfly flaps, that are configured to automatically open and close at least two separate openings of the aspiration inlet 122. In some embodiments, including the depicted embodiment, these flaps may be configured to open and close each of the openings defining the aspiration inlet 122. In the depicted embodiment, each of valves 162a and 162b comprises two flaps that are pivotably coupled to one another at a central portion of the respective valves 162. Thus, as shown in phantom on FIG. 2, valves 162a and 162b may be configured to pivot to their respective open configurations during inflation by pivoting their respective flaps at this central portion/line.

In some embodiments, the valve flaps of valves 162 may be sufficiently flexible such that the flaps flex during inflation. In some embodiments, however, these flaps may be sufficiently rigid so as to maintain a bias towards their respective closed configurations. In other words, the valves and/or valve flaps may be configured to require force to open (generated by a partial vacuum within an associated airbag cushion) and are otherwise biased towards their respective closed configurations. Although the valve flaps themselves may be configured to perform this function alone in some embodiments, in other embodiments, a support member of such valve flaps, such as a hinge, may be provided to facilitate a desired opening and closing function.

In some embodiments, the valve flaps 162 may comprise a relatively rigid material (at least compared to the fabric of airbag cushion 124). In some embodiments, such valve flaps may be configured to operate in a desired manner simply by rigidly coupling such flaps adjacent to aspiration inlet 122. Alternatively, flap(s) 162 may be hinged at one end such that flap(s) 162 are biased towards their respective closed positions. Some embodiments may comprise flaps that partially or fully overlap with one another.

Preferably, one or more novel features may be provided to facilitate assembly and/or a desired coupling between the various components of assembly 100. Thus, for example, one or more elements of assembly 100 may comprising a first mating component configured to mate, in some such embodiments to slidingly mate, with another element. Thus, in the depicted embodiment, inflation module 130 comprises a first mating component, namely, a pair of elongated rails 148, which, as previously mentioned, may also serve as support members for a frame 145. At least a portion of rails 148 are configured to be received in a corresponding second mating component, namely, a pair of elongated grooves 125 formed within aspiration housing 120. In some embodiments, rails 148 themselves may be received within grooves 125 or another similar features. However, as better shown in connection with embodiments and/or figures discussed below, in other embodiments, protrusions may be formed on rails 148, which protrusions may be received within grooves 125.

In the depicted embodiment, other mating components are provided that may further facilitate assembly and/or a desired coupling. In particular, aspiration housing 120 comprises a pair of elongated channels 123 configured to receive a corresponding pair of elongated rails 113 formed on airbag cushion housing 110. Each of elongated grooves 125 is formed adjacent to a respective elongated channel 123, which may allow airbag cushion housing 110, aspiration housing 120, and inflation module 130 to be slidably coupled to one another, in some embodiments without use of, or at least substantially without the use of, any fasteners.

Still other mating and/or coupling components may be provided to provide enhanced stability, ease of assembly, or other benefits. For example, aspiration housing 120 further comprises a set of protrusions 127, preferably corresponding in number to the number of inflation conduits 140, each of which is configured to be received within one of the inflation conduits at its respective distal end (relative to inflator 132) to further facilitate coupling inflation module 130 to aspiration housing 120. Protrusions 127 are circular so as to allow for mating with the ends of the inflation conduits 140. In order to do so, in some embodiments, protrusions 127 may be hollow in the center and defined by a circular rim, again, so as to receive a tube/conduit 140 therein. In some embodiments, protrusions 127 may also serve as "plugs" to block the distal ends of the respective inflation conduits 140. Alternatively, however, inflation conduits 140 may otherwise be blocked and the coupling between protrusions 127 and conduits 140 may instead be solely used to facilitate a desired coupling between the aforementioned elements of assembly 100.

Although in the depicted embodiment each of protrusions 127 is configured to extend into the distal opening formed in each respective inflation conduit 140, it is also contemplated that, in alternative embodiments, protrusions 127 may instead define a recess and/or other seat for receiving the distal ends of inflation conduits 140 therein. Thus, elements 127 may comprise a male component or, alternatively, a female component in a set of coupling elements with inflation module 130.

Valve assembly 160 may similarly be slidably couplable with aspiration housing 120. Thus, for example, a pivot point of the flaps 162 of valve assembly 160 may comprise an elongated protrusion or bead 161, as shown in FIG. 2, which may be slidably received within a corresponding, elongated slot 126 formed along the lower portion of aspiration housing 120. Both protrusion/bead 161 and slot 126 preferably comprises a bulbous lower portion and a narrowed neck portion to ensure that valve assembly 160 is kept in its proper position within aspiration housing 120.

Endcap 136 may further comprise one or more gas inlet ports 141. Each of the gas inlet ports 141 is fluidly coupled with inflator 132 and one or more of inflation conduits 140. In some embodiments, a separate gas inlet port 141 may be provided for each conduit 140. Alternatively, a single gas inlet port 141 may be provided that is indirectly coupled to either each of, or all but one of, for example, conduits 140.

As shown in FIGS. 2 and 3, other features/components may be used to lock various sub-elements of assembly 100 in place. Thus, for example, one or more clips 151 may be provided that may be configured to be received in one or more corresponding brackets 121. In the depicted embodiment, clips 151 comprise snap-tabs comprising resiliently flexible prongs formed on opposite sides of plate portion 139 of inflator hub 138. These prongs are configured to be received and locked in slots formed in brackets 121, which are formed on opposite sides of aspiration housing 120.

The cross-sectional view of FIG. 5 depicts flaps/valves 162a and 162b of valve assembly 160 in an open configuration during inflation of airbag cushion 124. As previously mentioned, by directing high-velocity inflation gas through inflation ports 142, a pressure differential is generated that preferably results in the opening of the valves and/or flaps of valve assembly 160 automatically (i.e., without further mechanical elements or other forces/actions). This allows the inflation of airbag cushion 124 to be supplemented by ambient air, which may enter airbag cushion 124 through the one or more openings of aspiration inlet 122. Preferably, inflation ports 142 may be used to generate a sufficient pressure differential to allow for valve flaps 162 to automatically open. This same pressure differential may then allow ambient air to assist with inflation of airbag cushion 124. Preferably, inflation gases are introduced in a forceful manner into airbag cushion 124. Thus, in addition to and/or as an alternative to the pressure differential, the velocity and/or rate of volume of gas delivered through ports 142 may be sufficient to cause ambient air to be entrained within the inflation gas and therefore aspirated into airbag cushion 124 along with this inflation gas.

At a desired point during inflation, valves and/or flaps of valve assembly 160 automatically close to prevent the air and inflation gases from escaping, or at least reduce the amount of air and inflation gases that may escape from, airbag cushion 124. Again, this may be accomplished in a number of ways but, preferably, the valves and/or flaps of valve assembly 160 are biased, either by way of a hinge, by way of their physical makeup and coupling/pivot point(s) of attachment, or otherwise, towards their respective closed positions, preferably such that a threshold amount of force and/or pressure is required in order to reposition them to their open configurations, after which they automatically return to their closed configurations.

Thus, the valve(s)/flap(s) of valve assembly 160 are preferably configured to operate in a closed configuration initially, and then automatically open during inflation, which may be caused by generating a partial vacuum within the airbag cushion 124 by, for example, the inflation gas from inflator 132. Following inflation, the system may be configured to automatically close again to maintain gases (both ambient air and inflation gas) in the cushion during occupant contact. The system may be specifically configured to provide for these three stages (closed, open during inflation, and re-closing during or following inflation) automatically at desired times by virtue of the positioning and configuration of the valve(s), conduits, ports, etc.

More specifically, upon initial deployment, there may be significant pressure achieved in the cushion 124 prior to the cushion 124 breaking through a cover (the "breakout phase" of the deployment). With this high pressure, the potential for leakage out the back of the housing is very high without blocking the aspiration inlet 122. Failure to block aspiration inlet 122 may also inhibit desired cushion restraint. Following the breakout phase, it is preferred that the aspiration inlet 122 be opened as quickly as possible to allow for ambient air to assist in the inflation process.

Again, following the decrease of the pressure differential previously mentioned, a pressure differential developed in an opposite direction, and/or the cessation of inflation gasses being delivered through inflation ports 142, valve flaps 162 may be configured to automatically close again. As previously mentioned, in some embodiments, valve flaps 162 may be biased towards their respective closed positions to facilitate this stage of inflation. One or more airbag cushion vents (not shown) may be used and may be tuned to provide desired deployment/restraint characteristics.

Figure 8:
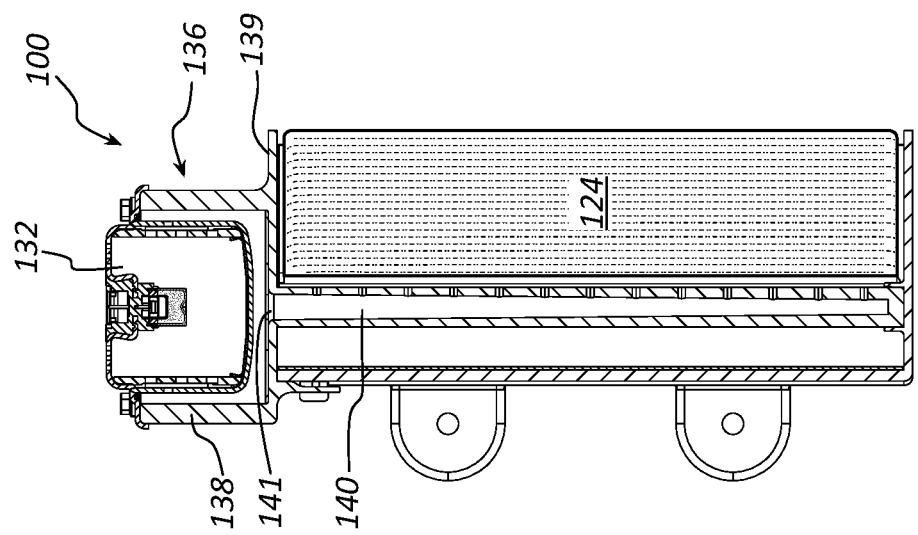
FIG. 8 is a cross-sectional view taken along line 8-8 in FIG. 6.
Figure 6:
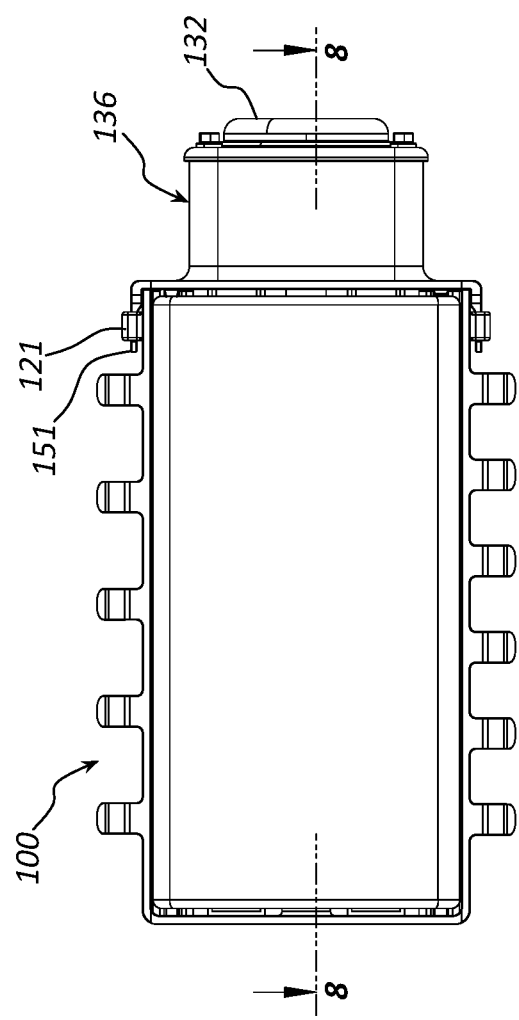
FIG. 6 is a top plan view of the aspirating airbag inflation assembly of FIG. 1.
Figure 7:
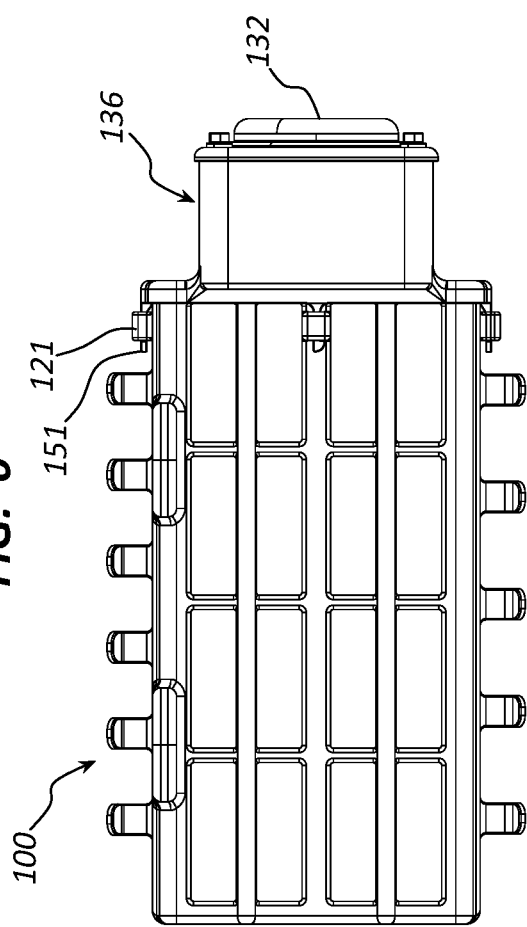
FIG. 7 is a bottom plan view of the aspirating airbag inflation assembly of FIG. 1.
Figure 10:
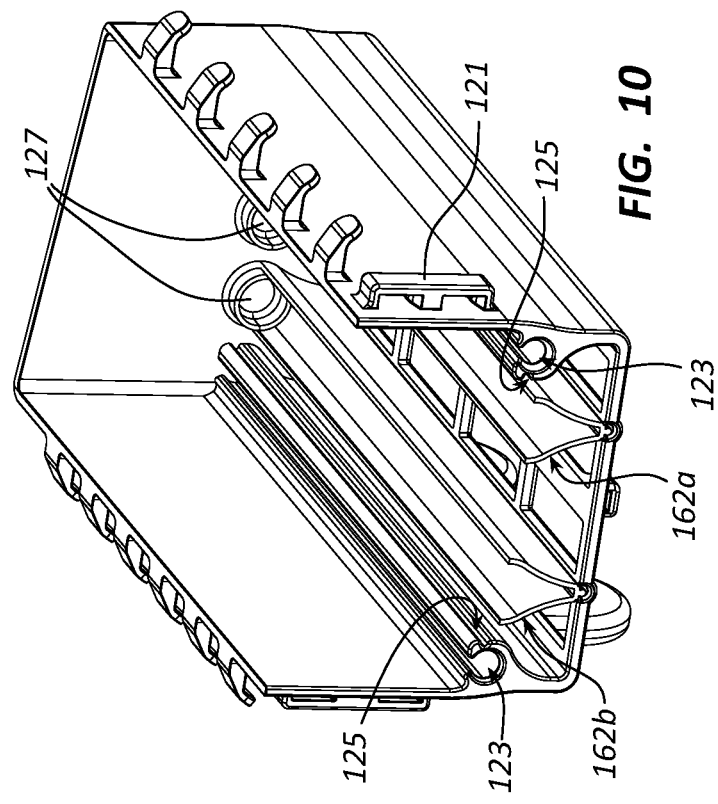
FIG. 10 is a perspective view of an aspiration housing of an aspirating airbag inflation assembly according to some embodiments.
Figure 11:
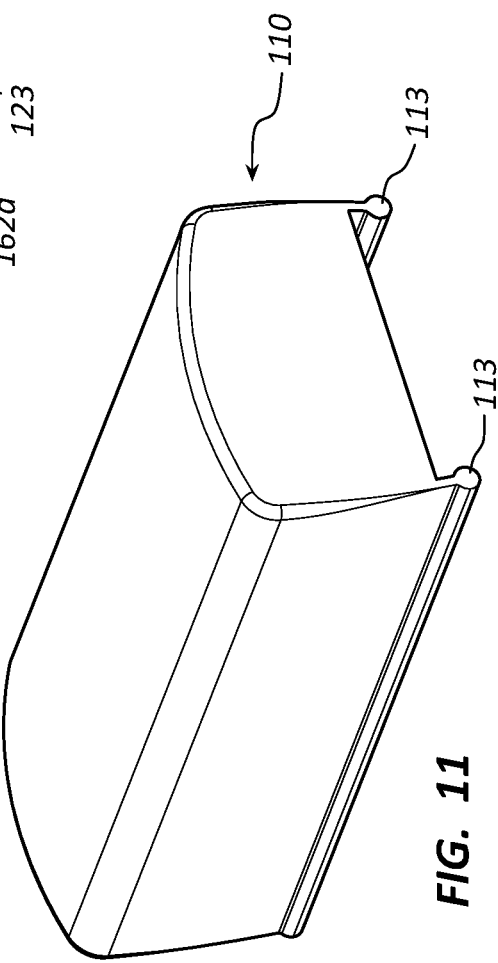
FIG. 11 is a perspective view of an airbag cushion housing of an aspirating airbag inflation assembly according to some embodiments.
Figure 9:
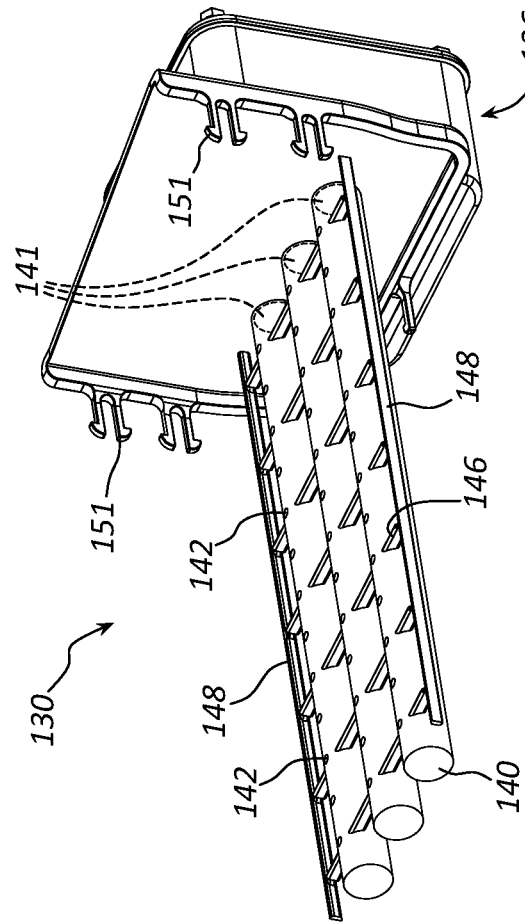
FIG. 9 is a perspective view of an aspirating airbag inflation module according to some embodiments.

As shown in the cross-sectional view of FIG. 8, in preferred embodiments, one or more (in some embodiments, all) of the inflation conduits 140 may have a cross-sectional dimension that decreases in size as the inflation conduit 140 extends away from the inflator 132 and/or endcap 136. This may be useful for having a uniform, or at least more uniform, distribution of gas through each of the various inflation ports 142 during inflation. Thus, in some such embodiments, the cross-sectional diameter of inflation conduit(s) may have a gradual taper from inflator 132 and/or endcap 136 to the distal end of each respective inflation conduit 140. In this manner, the velocity and other volume of gas per unit time through each of the inflation ports 142 may be made more uniform. Thus, in some embodiments, each of ports 142 may be configured to deliver a flow of air that is at least substantially uniform relative to the other ports 142.

However, in alternative embodiments, the cross-sectional diameter and/or other dimension may vary in other ways, such as via one or more steps or otherwise more abrupt changes in such cross-sectional diameter/dimension. In preferred embodiments, inflation conduits 140 may be made from a molded thermoplastic material.

Hinges, such as spring-loaded hinges, are an example of a means for biasing an aspiration valve towards a closed position. A rigid coupling of a flexible valve flap adjacent an aspiration opening is another example of means for biasing an aspiration valve towards a closed position. As also previously mentioned, in some embodiments, a portion of valve flap(s) 162 of valve assembly 160 may be formed with one or more grooves, which groove(s) that may be configured to serve as a "hinge" for facilitating opening and/or closing of the valve by pressure differentials between the inside and outside of the airbag cushion 124 alone.

As shown in the accompanying drawings, in preferred embodiments, the valve(s) and/or valve assembly, such as valve flaps 162, are positioned between the aspiration inlet(s) 122 and the inflation port(s) 142 and/or inflation conduit(s) 140. The inventors have discovered that, although alternative embodiments are contemplated in which such flaps or other valve elements may be positioned above and/or in the path of inflation gases, such designs may inhibit desired closing of the valve and allow for more leakage through the aspiration inlet(s) than may be ideal. Thus, the depicted embodiment deliberately places these valve elements below the inflation conduits/ports.

In the depicted embodiment, the valve flaps are positioned away from a flow path of the inflation ports 142 and positioned between the aspiration inlet 122 and the inflation ports 142. In the depicted embodiment, each of these statements is true in both the closed and open configurations, although alternative embodiments are contemplated in which one or more of these statements may only be true in the closed configuration and/or one or more (or all) of these statements may not true. In other words, for example, in some embodiments, the valve flaps 162 may be partially positioned above the inflation ports 142 in the open configuration. In addition, although the depicted embodiment comprises non-overlapping valve flaps 162, other embodiments are contemplated in which the valve flaps may overlap, either fully or partially, with one another in a desired manner.

Although the embodiment depicted in FIGS. 1-11 is configured to be substantially free of fasteners (the only fasteners used are to couple inflator 132 with inflator with inflator hub 138, as best shown in FIG. 2), other embodiments are contemplated that are entirely free of fasteners. It should be understood that assemblies are to be considered entirely free of fasteners even if individual elements, such as inflator 132, might themselves have fasteners so long as the individual elements coupled together for the assembly are so coupled without use of fasteners.

An example of an aspirating airbag cushion assembly 200 that is entirely free of fasteners is shown in FIGS. 12-23. Assembly 200 differs from assembly 100 in a few ways. Most notably, inflator 232 comprises a snap-fit coupling rather than requiring fasteners. To accomplish this, snap-fit coupling means are provided that comprise snap tabs or clips 247 on inflator 232 and corresponding brackets/slots 237 formed on inflator hub 238 of endcap 236. Clips 247 may, similar to clips 151/251, comprise resiliently flexible prongs in some embodiments.

Figure 12:
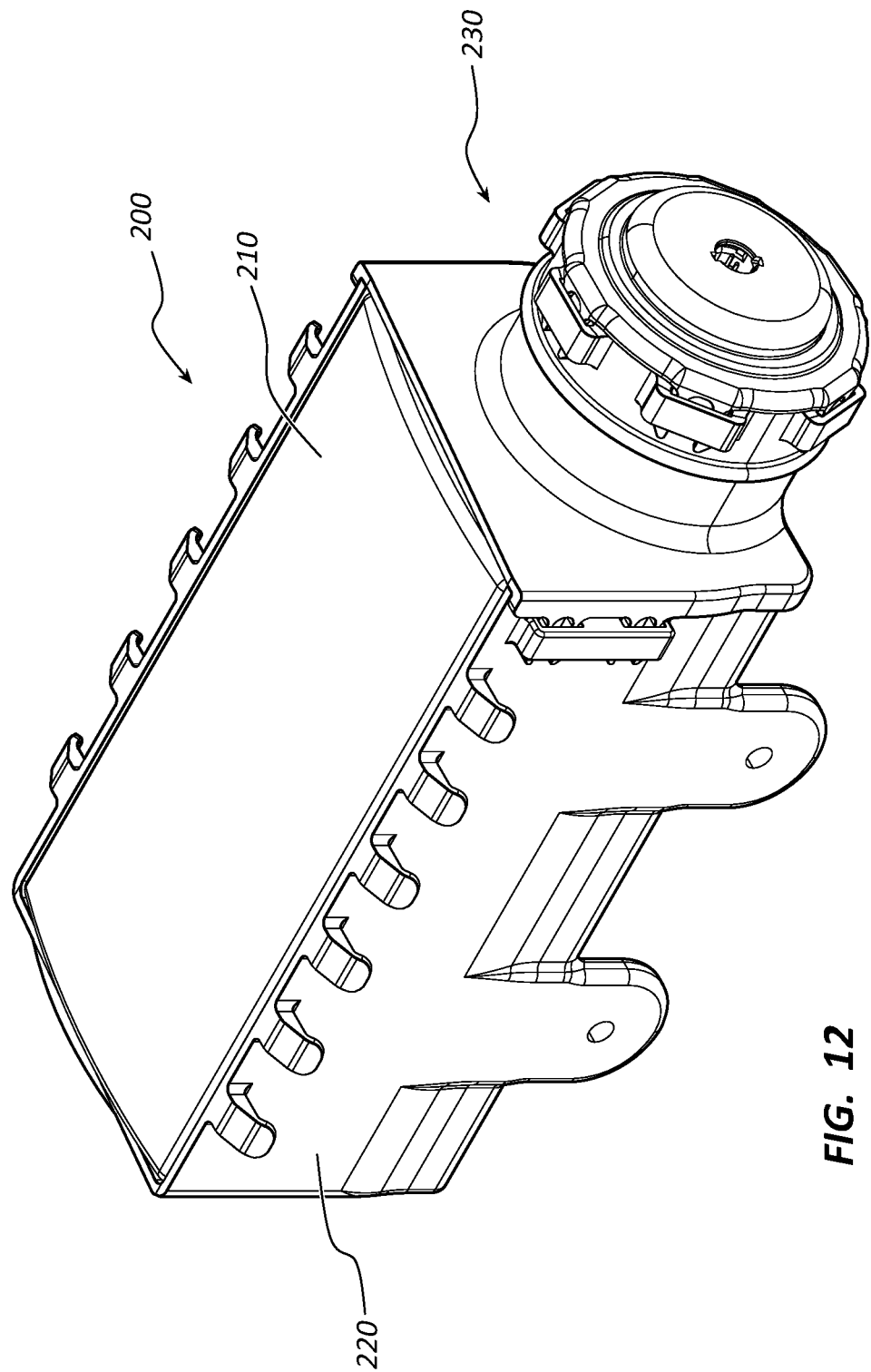
FIG. 12 is a perspective view of an aspirating airbag inflation assembly according to another embodiment.

Assembly 200 may otherwise be similar to assembly 100. Thus, as shown in FIG. 12, aspirating airbag cushion assembly 200 again comprises an airbag cushion housing 210 comprising an airbag cushion 224 positioned and configured to deploy therefrom. Aspirating also airbag cushion assembly 200 further comprises an aspiration housing 220 coupled to the airbag cushion housing 210. The aspiration housing 220 comprises an open side and/or opening at its upper side for receiving an airbag cushion 224 and/or airbag cushion housing 210. Opposite this open side, aspiration housing 220 comprises an aspiration inlet 222 configured to allow for receipt of ambient air into the airbag cushion during inflation. In the depicted embodiment, aspiration inlet 222 comprises a plurality of openings aligned in a grid pattern along this side of aspiration housing 220.

An inflation module 230 is slidably coupled to aspiration housing 220. As previously mentioned, inflation module 230 comprises an inflator 232 that is configured to be received in a recess 234 formed in endcap 236 of inflation module 230. Again, inflator 232 is configured to snap-fit and lock into place within recess 234 by way of clips 247 and recesses/brackets 237. In some embodiments, inflator 232 may comprise an annular diffuser that may be positioned and configured to facilitate a desired distribution of inflation gas from inflator 232 prior to entering inflation conduits 240.

As with endcap 136, endcap 236 comprises an inflator hub 238 protruding from a plate portion 239. Hub 238 defines recess 234 for receiving inflator 232 therein. In addition, as previously mentioned, endcap 236 is, preferably and in the depicted embodiment, configured to close, or at least substantially close, one side (possibly more than one side in other embodiments) of the aspiration housing 220 upon coupling the inflation module 230 with the aspiration housing 220. In some embodiments, endcap 236 is an integrally formed element of the inflation module 230.

Inflation module 230 further comprises a plurality of inflation conduits 240 fluidly coupled with inflator 232. Each of the inflation conduits 240 again comprises a plurality of inflation ports 242 configured to deliver inflation gas from inflator 232 into the airbag cushion 224. Preferably, hat the inflation gas is delivered at a sufficiently high velocity to draw or entrain ambient air through aspiration inlet 222 and into the airbag cushion 224 during inflation.

Inflation module 230 further comprises a frame 245 defined by a plurality of cross-support members 246 extending perpendicular to the inflation conduits 240 and/or parallel support members 248.

Assembly 200 further comprises a valve assembly 260 comprising one or more valves preferably configured to automatically open upon actuation of inflator 232 and further configured to automatically close during inflation of the airbag cushion 224 to prevent air and inflation gas from exiting through aspiration inlet 222. More particularly, valve assembly 260 comprises a first valve 262a and a second valve 262b, each of which may comprise a pair of flaps that are preferably configured to automatically open and close at least two separate openings of the aspiration inlet 222 at predetermined stages during an inflation process.

Figure 13:
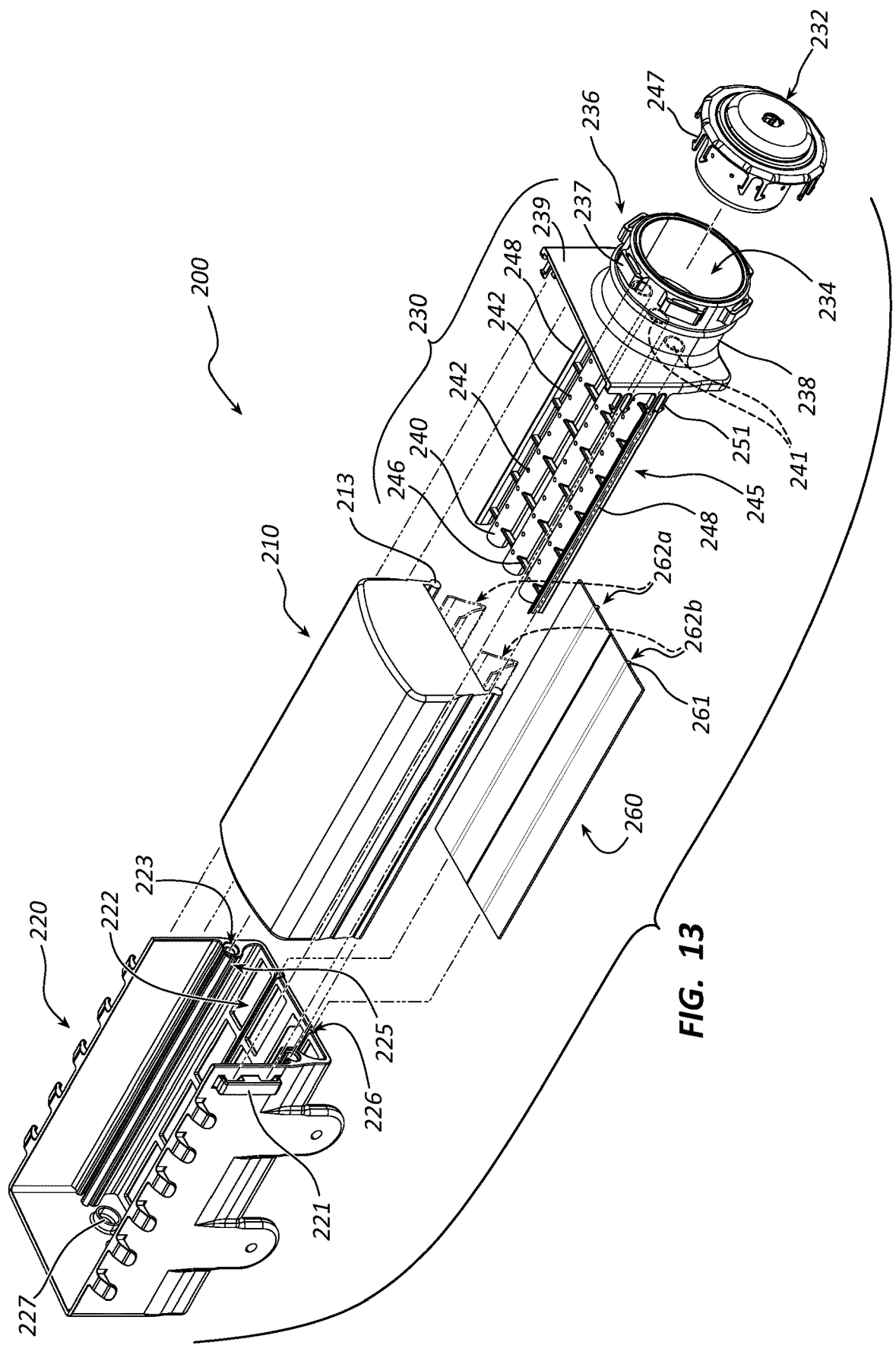
FIG. 13 is an exploded, perspective view of the aspirating airbag inflation assembly of FIG. 12.
Figure 15:
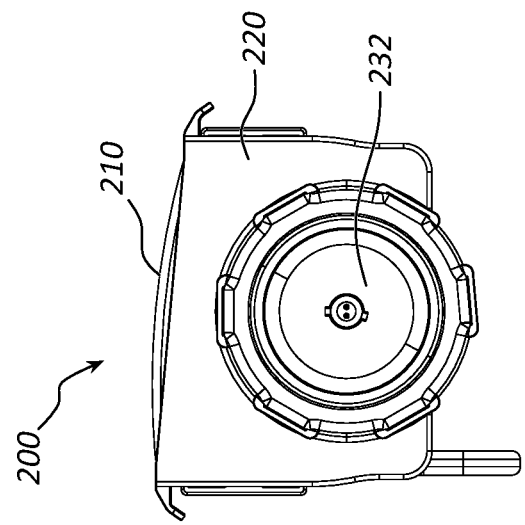
FIG. 15 is a front elevation view of the aspirating airbag inflation assembly of FIG. 12.
Figure 16:
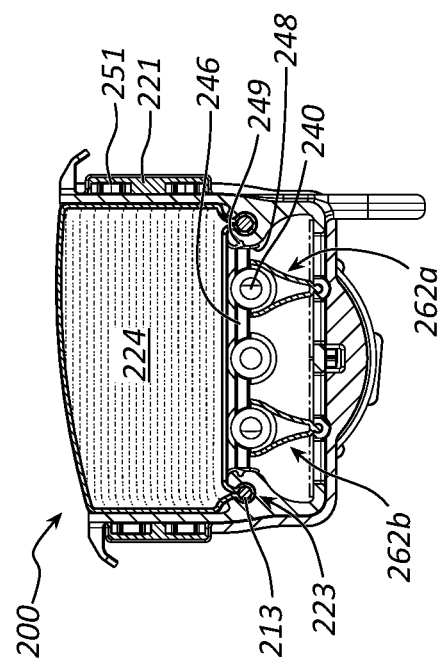
FIG. 16 is a cross-sectional view taken along line 16-16 in FIG. 14.
Figure 14:
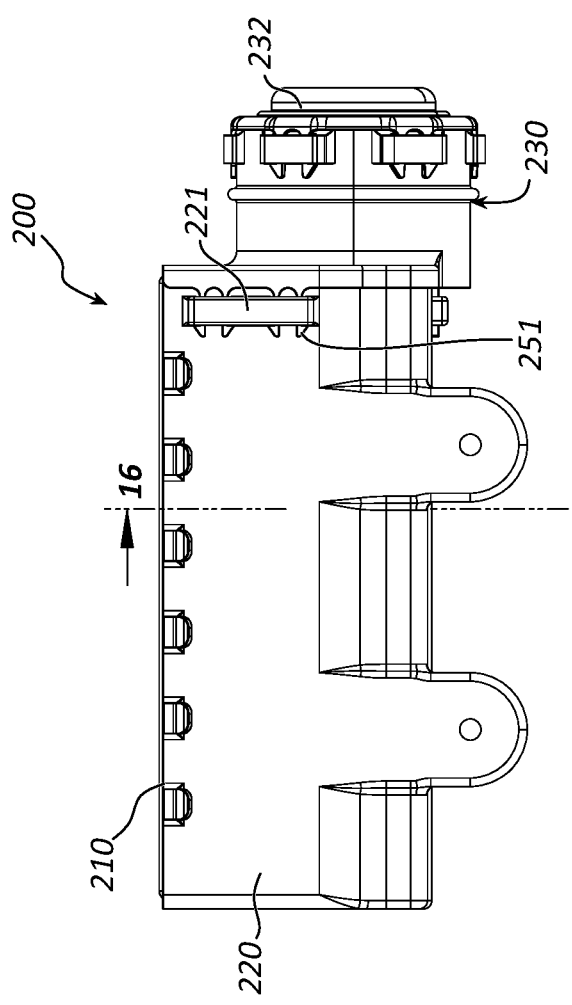
FIG. 14 is a side elevation view of the aspirating airbag inflation assembly of FIG. 12.
Figure 19:
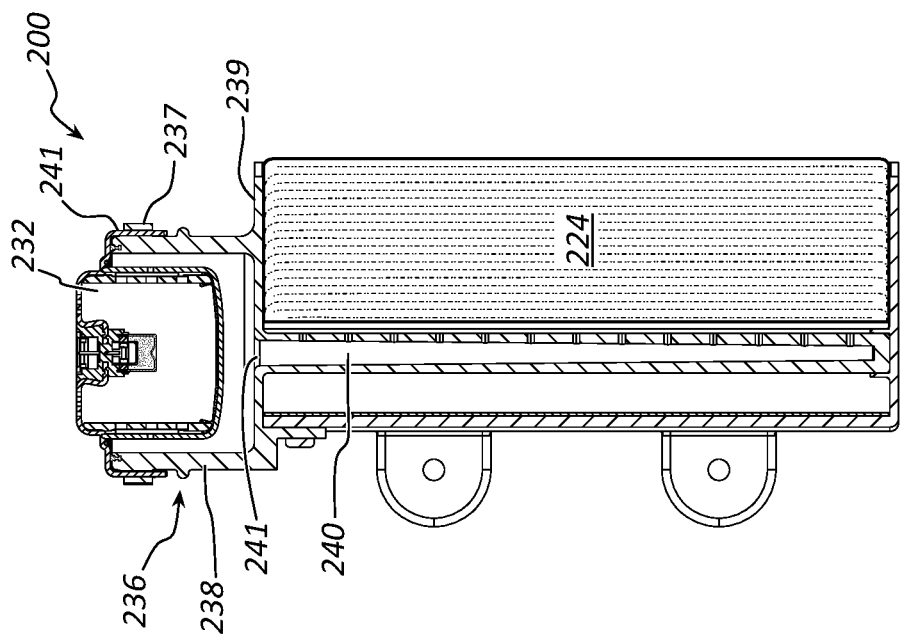
FIG. 19 is a cross-sectional view taken along line 19-19 in FIG. 17.
Figure 17:
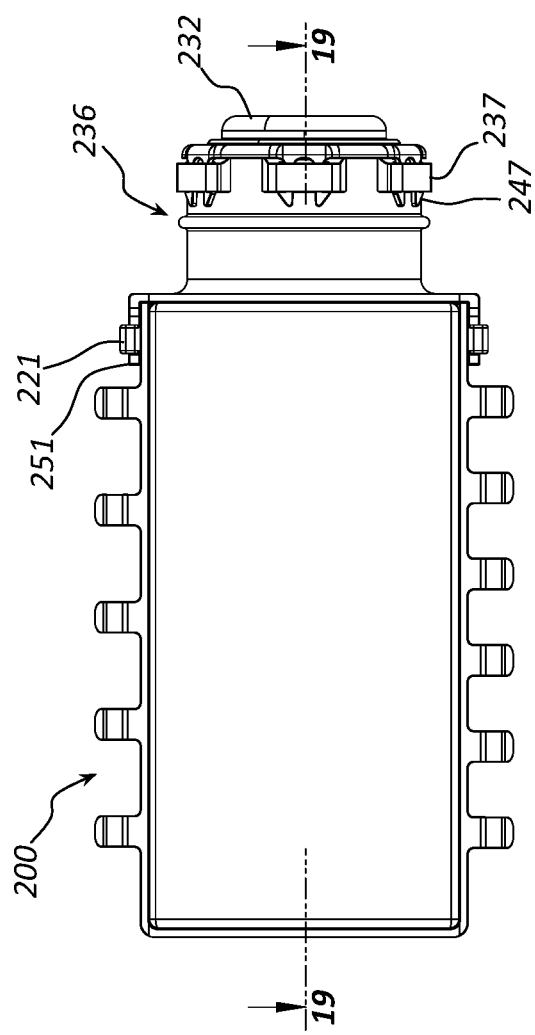
FIG. 17 is a top plan view of the aspirating airbag inflation assembly of FIG. 2.
Figure 18:
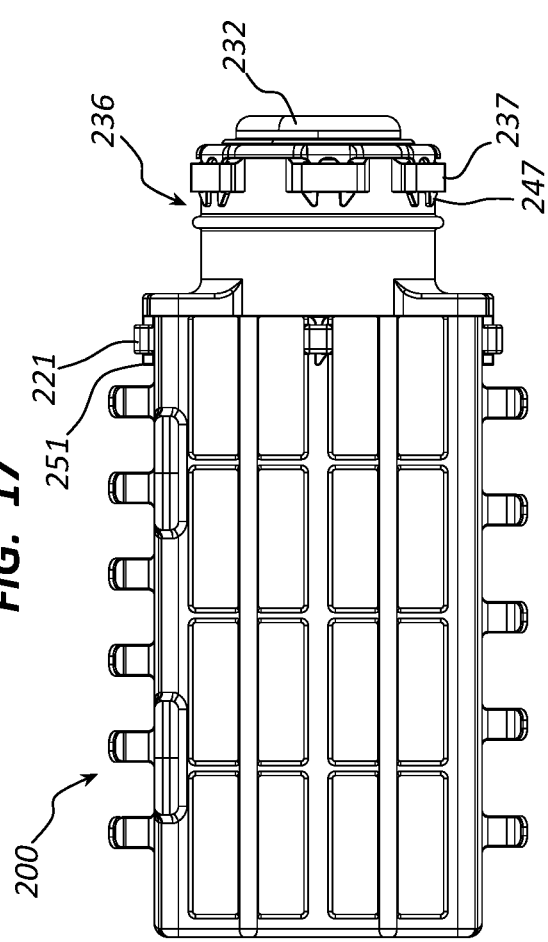
FIG. 18 is a bottom plan view of the aspirating airbag inflation assembly of FIG. 12.

As with valve assembly 160, valve assembly 260 may be slidably couplable with aspiration housing 220 by providing an elongated protrusion or bead 261 on each valve/flap 262, as shown in FIG. 13, which may be slidably received within a corresponding, elongated slot 226 formed along the lower portion of aspiration housing 220.

Inflation module 230 further comprises one or more pairs of mating coupling elements, as previously mentioned. Thus, inflation module 230 comprises a pair of elongated rails 248, which, as previously mentioned, may also serve as support members for a frame 245. An outer portion of each of rails 248 defines an elongated protrusion 249 that is configured to be received in a corresponding elongated groove 225 formed within aspiration housing 220.

Aspiration housing 220 further comprises a pair of elongated channels 223 configured to receive another pair of elongated rails 213 formed on airbag cushion housing 210. Each of elongated grooves 225 is formed adjacent to a respective elongated channel 223, which may allow airbag cushion housing 210, aspiration housing 220, and inflation module 230 to be slidably coupled to one another without use of, or at least substantially without the use of, any fasteners.

Aspiration housing 220 further comprises a set of protrusions 227, preferably corresponding in number to the number of inflation conduits 240, each of which may have a cross-sectional shape that corresponds with (circular in the depicted embodiment) and is configured to be received within one of the inflation conduits at its respective distal end to further facilitate coupling inflation module 230 to aspiration housing 220.

As previously mentioned, endcap 236 may further comprise one or more gas inlet ports fluidly coupled with inflator 232 and one or more of inflation conduits 240 to provide a fluid deliver path from inflator 232 into inflation conduits 240. As previously mentioned, one or more clips 251 may be provided that may be configured to be received in one or more corresponding brackets 221 to secure inflation module 230 in place with respect to aspiration housing 220.

Once again, in preferred embodiments, one or more (in some embodiments, all) of the inflation conduits 240 may have a cross-sectional dimension that decreases in size as the inflation conduit 240 extends away from the inflator 232 and/or endcap 236. Similarly, hinges, a rigid coupling of a flexible valve flap adjacent an aspiration opening, a portion of valve flap(s) 262 of valve assembly 260 formed with one or more grooves serving as a "hinge," or otherwise the material of flaps 262 and/or points of attachment may be used to control the opening and/or closing parameters of the valve assembly 260.

Figure 23:
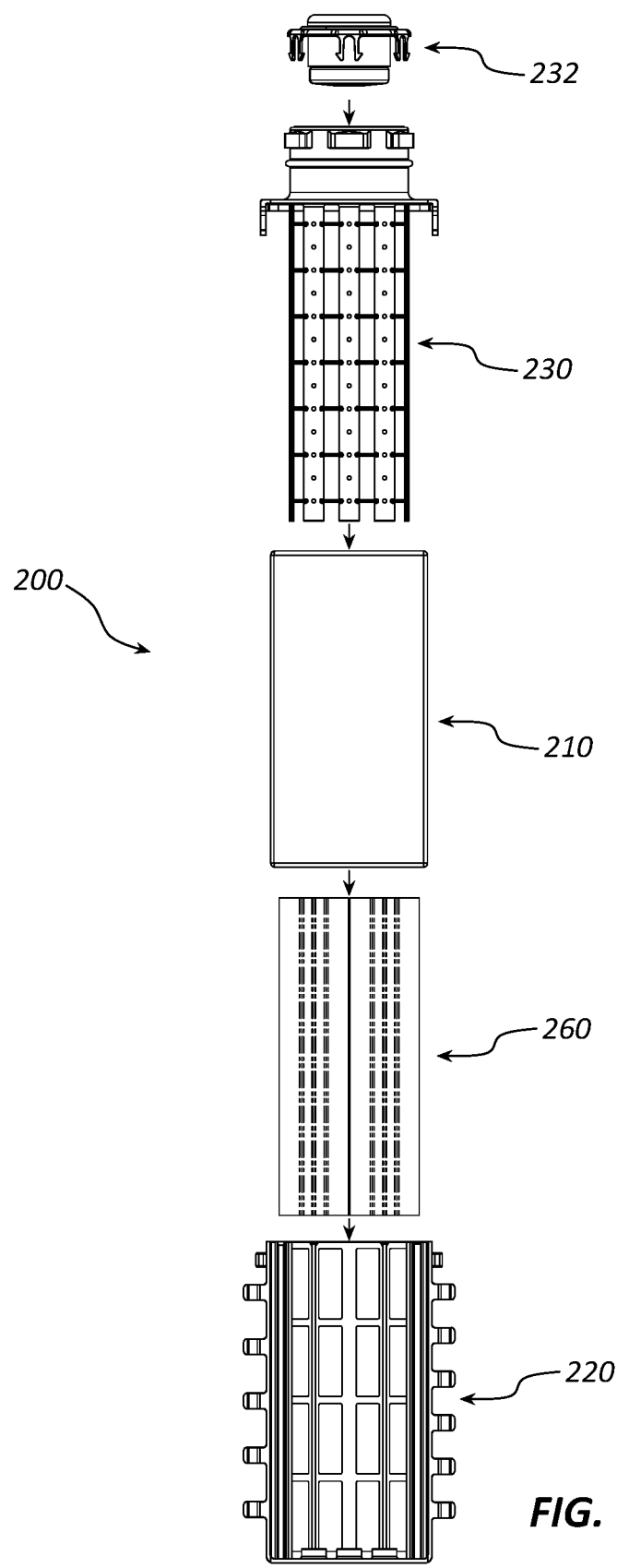
FIG. 23 is an exploded view of the aspirating airbag inflation assembly of FIG. 12 illustrating how an assembly process may be gravity-fed and/or gravity assisted and need not involve fasteners.

FIG. 23 illustrates the ease of assembly of aspirating airbag cushion assembly 200. Again, because aspirating airbag cushion assembly 200 is free, or at least substantially free (again, fasteners may be present in one or more of the individual elements of assembly 200 depicted in FIG. 23), of fasteners, the assembly process may comprise a gravity-fed or gravity-assisted assembly process whereby each of the depicted elements is simply dropped and/or slid into place to complete the assembly.

More particularly, valve assembly 260 may be slid into place within aspiration housing 220 by inserting the elongated bead/protrusion 261 extending along the pivot lines of both valves/flaps 262 into the corresponding slot 226 formed within aspiration housing 220 adjacent to aspiration inlet 222. Similarly, airbag cushion housing 210 can be slid into place within aspiration housing 220 by inserting elongated rails 213 into elongated channels 223 and inflation module 230 can be slid into place by inserting at least a portion of rails 248, such as elongated protrusions 249, into a corresponding elongated groove 225 of aspiration housing 220. The assembly 200 may then be locked in place by snapping clips 247 of endcap 236 in place within their respective slots formed on the exterior surface of aspiration housing 220. Similarly, inflator 232 may be slid and locked in place by sliding inflator 232 into the recess 234 of endcap 236 and then inserting the base portion of inflator 232 until the clips 247 have been received within their respective slots 237 formed on the exterior surface of hub 238 of endcap 236 to lock inflator 232 therein.

It should be understood that the assembly process of aspirating airbag cushion assembly 100 may also comprise a gravity-fed or gravity-assisted assembly process whereby each of the depicted elements (other than the inflator 132) is simply dropped and/or slid into place to complete the assembly. Thus, aspirating airbag cushion assembly 100 should be considered to comprise an assembly that is substantially free of fasteners (in that each of the major elements of the assembly is configured for being coupled with the other major elements of the assembly without use of fasteners, even though these elements themselves may comprise fasteners).

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An aspirating airbag cushion assembly, comprising:
   an airbag cushion housing comprising an airbag cushion configured to deploy from the airbag cushion housing;
   an aspiration housing coupled to the airbag cushion housing, wherein the aspiration housing comprises an aspiration inlet configured to allow for receipt of ambient air into the airbag cushion during inflation of the airbag cushion; and
   an inflation module slidably coupled to the aspiration housing, wherein the inflation module comprises:
   an inflator; and
   at least one inflation tube fluidly coupled with the inflator, wherein the at least one inflation tube is configured to deliver inflation gas from the inflator into the airbag cushion via a plurality of inflation ports formed within the at least one inflation tube.

2. The aspirating airbag cushion assembly of claim 1, further comprising a valve assembly comprising at least one valve configured to open upon actuation of the inflator, wherein the at least one valve is configured to close during inflation of the airbag cushion to prevent air and inflation gas from exiting through the aspiration inlet.

3. The aspirating airbag cushion assembly of claim 1, wherein the inflation module further comprises an endcap configured to at least substantially close at least one side of the aspiration housing upon coupling the inflation module with the aspiration housing.

4. The aspirating airbag cushion assembly of claim 3, wherein the endcap is an integrally formed element of the inflation module.

5. The aspirating airbag cushion assembly of claim 3, wherein the endcap comprises a gas inlet port, wherein the gas inlet port is fluidly coupled with the inflator.

6. The aspirating airbag cushion assembly of claim 1, wherein the inflation module further comprises a first mating component, wherein the aspiration housing further comprises a second mating component, and wherein the first mating component is configured to mate with the second mating component to couple the inflation module with the aspiration housing.

7. The aspirating airbag cushion assembly of claim 6, wherein the first mating component comprises an elongated groove, wherein the second mating component comprises an elongated protrusion, and wherein the elongated groove is configured to slidably receive the elongated protrusion.

8. The aspirating airbag cushion assembly of claim 7, wherein the first mating component comprises a pair of opposing elongated grooves, wherein the second mating component comprises a pair of opposing elongated protrusions, and wherein the pair of opposing elongated grooves is configured to slidably receive the pair of opposing elongated protrusions.

9. The aspirating airbag cushion assembly of claim 1, wherein the aspiration housing further comprises at least one protrusion configured to be engaged with the at least one inflation tube to facilitate coupling the inflation module to the aspiration housing.

10. The aspirating airbag cushion assembly of claim 9, wherein the at least one inflation tube comprises a plurality of inflation tubes, and wherein the at least one protrusion comprises a plurality of protrusions each configured to be received within one of the plurality of inflation tubes.

11. An aspirating airbag cushion assembly, comprising:
an airbag cushion;
a housing comprising an aspiration inlet configured to allow for receipt of ambient air into the airbag cushion during inflation of the airbag cushion;
an inflator; and
an inflation module comprising a plurality of inflation conduits configured to deliver inflation gas from the inflator, wherein each of the plurality of inflation conduits comprises a plurality of inflation ports, wherein each of the plurality of inflation ports is configured to, upon actuation of the inflator, draw ambient air through the aspiration inlet, and wherein the inflation module is configured to be coupled with the housing by way of at least one groove configured to mate with and receive at least one protrusion.

12. The aspirating airbag cushion assembly of claim 11, wherein the inflation module is configured to be slidably coupled to the housing.

13. The aspirating airbag cushion assembly of claim 12, wherein the inflation module comprises a pair of opposing, elongated protrusions, and wherein the housing comprises a plurality of opposing, elongated grooves configured to slidably receive the pair of opposing, elongated protrusions.

14. The aspirating airbag cushion assembly of claim 11, further comprising a valve assembly comprising at least one valve flap.

15. The aspirating airbag cushion assembly of claim 14, wherein the valve assembly is configured such that the at least one valve flap opens upon actuation of the inflator, and wherein the valve assembly is further configured such that the at least one valve flap closes following aspiration of the airbag cushion to prevent air and inflation gas from exiting through the aspiration inlet following inflation of the airbag cushion.

16. An aspirating airbag cushion assembly, comprising:
an airbag cushion;
a housing comprising:
    a first side comprising an aspiration inlet configured to allow for receipt of ambient air into the airbag cushion during inflation of the airbag cushion;
    a second side opposite from the first side, wherein the second side comprises a first opening for receiving the airbag cushion;
    a third side extending between the first side and the second side at a first end of the housing, wherein the third side is at least substantially closed; and
    a fourth side opposite from the third side at a second end of housing, wherein the fourth side comprises a second opening; and
an inflation module configured to be received in the second opening, wherein the inflation module comprises an endcap configured to at least substantially close the fourth side upon coupling the inflation module with the housing, and wherein the endcap comprises:
    a hub defining a recess for receiving an inflator therein; and
    a plate portion extending from the hub.

17. The aspirating airbag cushion assembly of claim 16, wherein the endcap comprises a gas inlet port.

18. The aspirating airbag cushion assembly of claim 17, wherein the inflation module comprises:
the inflator; and
a plurality of inflation conduits, wherein the gas inlet port is fluidly coupled with the inflator to allow for delivery of inflation gas into the plurality of inflation conduits.

19. The aspirating airbag cushion assembly of claim 18, wherein the inflation module further comprises a plurality of cross members extending perpendicular to the plurality of inflation conduits.

20. The aspirating airbag cushion assembly of claim 16, wherein the endcap is an integrally formed element of the inflation module.

* * * * *